(12) United States Patent
Adams et al.

(10) Patent No.: US 7,674,540 B2
(45) Date of Patent: Mar. 9, 2010

(54) FUEL CARTRIDGES FOR FUEL CELLS AND METHODS FOR MAKING SAME

(75) Inventors: Paul Adams, Monroe, CT (US); Andrew J. Curello, Hamden, CT (US)

(73) Assignee: Societe BIC (FR)

( * ) Notice: Subject to any disclaimer, the term of this patent is extended or adjusted under 35 U.S.C. 154(b) by 148 days.

(21) Appl. No.: 10/679,756

(22) Filed: Oct. 6, 2003

(65) Prior Publication Data

US 2005/0074643 A1  Apr. 7, 2005

(51) Int. Cl.
*H01M 8/06* (2006.01)
*B01J 8/00* (2006.01)

(52) U.S. Cl. .......................... 429/19; 422/187
(58) Field of Classification Search ........................ None
See application file for complete search history.

(56) References Cited

U.S. PATENT DOCUMENTS

| | | | |
|---|---|---|---|
| 3,459,510 A | 8/1969 | Litz et al. | |
| 4,261,956 A | 4/1981 | Adlhart | |
| 4,562,123 A | 12/1985 | Shimizu et al. | |
| 5,372,617 A | 12/1994 | Kerrebrock et al. | |
| 5,723,229 A | 3/1998 | Scheifers et al. | |
| 6,268,077 B1 | 7/2001 | Kelley et al. | |
| 6,460,733 B2 | 10/2002 | Acker et al. | |
| 6,506,513 B1 | 1/2003 | Yonetsu et al. | |
| 6,534,033 B1 | 3/2003 | Amendola et al. | |
| 6,544,400 B2 | 4/2003 | Hockaday | |
| 6,592,741 B2 | 7/2003 | Nakanishi et al. | |
| 6,604,598 B1 | 8/2003 | Rohde et al. | |
| 6,610,433 B1 | 8/2003 | Herdeg et al. | |
| 6,632,553 B2 | 10/2003 | Corey et al. | |
| 6,645,651 B2 | 11/2003 | Hockaday | |
| 6,649,298 B2 | 11/2003 | Hayashi et al. | |
| 6,660,421 B2 | 12/2003 | Merin Celemin et al. | |
| 6,660,423 B2 | 12/2003 | Neutzler et al. | |
| 6,932,847 B2 | 8/2005 | Amendola | |
| 7,105,033 B2 | 9/2006 | Strizki | |
| 7,220,290 B2 | 5/2007 | Amendola et al. | |
| 7,344,571 B2 | 3/2008 | Bae et al. | |
| 2002/0018925 A1 | 2/2002 | Merin Celemin et al. | |
| 2002/0154915 A1 | 10/2002 | Bullock et al. | |
| 2002/0197522 A1 | 12/2002 | Lawrence et al. | |
| 2003/0003341 A1 | 1/2003 | Kinkelaar et al. | |
| 2003/0008193 A1 | 1/2003 | Kinkelaar et al. | |
| 2003/0009942 A1 | 1/2003 | Amendola et al. | |

(Continued)

OTHER PUBLICATIONS

International Search Report and Written Opinion of the International Searching Authority, mailed Feb. 3, 2006.

*Primary Examiner*—Robert Hodge
(74) *Attorney, Agent, or Firm*—The H.T. Than Law Group

(57) ABSTRACT

Fuel supplies for fuel cells are disclosed. The fuel supplies can be a pressurized or non-pressurized cartridge that can be used with any fuel cells, including but not limited to, direct methanol fuel cell or reformer fuel cell. In one aspect, a fuel supply may contain a reaction chamber to convert fuel to hydrogen. The fuel supplies may also contain a pump. The fuel supply may have a valve connecting the fuel to the fuel cell, and a vent to vent gas from the fuel supply. Methods for forming various fuel supplies are also disclosed.

52 Claims, 9 Drawing Sheets

U.S. PATENT DOCUMENTS

| | | |
|---|---|---|
| 2003/0082416 A1 | 5/2003 | Bullock et al. |
| 2003/0082426 A1 | 5/2003 | Bullock et al. |
| 2003/0082427 A1* | 5/2003 | Prasad et al. ............. 429/34 |
| 2003/0096144 A1 | 5/2003 | Dunstan |
| 2003/0113259 A1 | 6/2003 | Rusta-Sallehy et al. |
| 2003/0129464 A1 | 7/2003 | Becerra et al. |
| 2003/0138679 A1* | 7/2003 | Prased et al. ............. 429/19 |
| 2003/0143450 A1 | 7/2003 | Ozeki et al. |
| 2003/0190504 A1 | 10/2003 | Fisher et al. |
| 2003/0194368 A1 | 10/2003 | Devos et al. |
| 2003/0194590 A1 | 10/2003 | Cargnelli et al. |
| 2003/0215686 A1 | 11/2003 | DeFilippis et al. |
| 2003/0224229 A1 | 12/2003 | Mann et al. |
| 2003/0235724 A1 | 12/2003 | Ord et al. |
| 2004/0048115 A1 | 3/2004 | Devos |
| 2004/0202903 A1 | 10/2004 | DeVos et al. |
| 2005/0023236 A1* | 2/2005 | Adams et al. ............. 215/3 |
| 2005/0158595 A1 | 7/2005 | Marsh et al. |

* cited by examiner

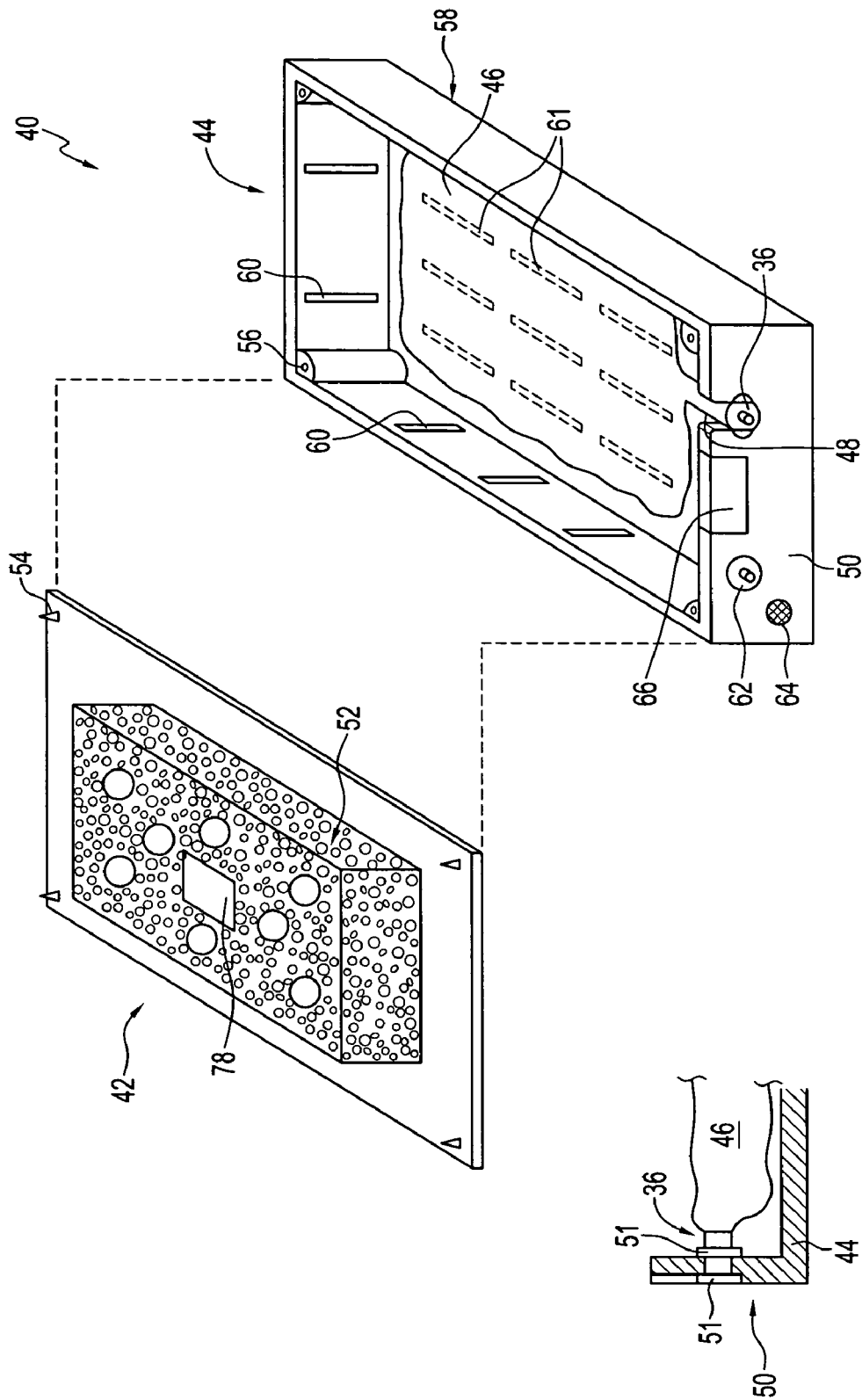

FUEL CARTRIDGES FOR FUEL CELLS AND METHODS FOR MAKING SAME

FIELD OF THE INVENTION

This invention generally relates to fuel cartridges supplying fuel to various fuel cells, and relates to cartridge components.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel and more efficient than portable power storage, such as lithium-ion batteries.

In general, fuel cell technologies include a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into three general categories, namely, fuel cells utilizing compressed hydrogen ($H_2$) as fuel; proton exchange membrane (PEM) fuel cells that use methanol ($CH_3OH$), sodium borohydride ($NaBH_4$), hydrocarbons (such as butane) or other fuels reformed into hydrogen fuel; and PEM fuel cells that use methanol ($CH_3OH$) fuel directly ("direct methanol fuel cells" or DMFC). Compressed hydrogen is generally kept under high pressure and is therefore difficult to handle. Furthermore, large storage tanks are typically required and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. DMFC, where methanol is reacted directly with oxidant in the fuel cell, is the simplest and potentially smallest fuel cell, and also has promising power application for consumer electronic devices.

DMFC for relatively larger applications typically comprises a fan or compressor to supply an oxidant, typically air or oxygen, to the cathode electrode, a pump to supply a water/methanol mixture to the anode electrode and a membrane electrode assembly (MEA). The MEA typically includes a cathode, a PEM and an anode. During operation, the water/methanol liquid fuel mixture is supplied directly to the anode, and the oxidant is supplied to the cathode. The chemical-electrical reaction at each electrode and the overall reaction for a direct methanol fuel cell are described as follows:

Reaction at the anode:

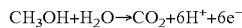

Reaction at the cathode:

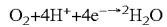

The overall fuel cell reaction:

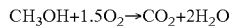

Due to the migration of the hydrogen ions ($H^+$) through the PEM from the anode through the cathode and due to the inability of the free electrons ($e^-$) to pass through the PEM, the electrons must flow through an external circuit, which produces an electrical current through the external circuit. The external circuit may be any useful consumer electronic devices, such as mobile or cell phones, calculators, personal digital assistants, laptop computers, and power tools, among others. DMFC is discussed in U.S. Pat. Nos. 5,992,008 and 5,945,231, which are incorporated by reference in their entireties. Generally, the PEM is made from a polymer, such as Nafion® available from DuPont, which is a perfluorinated material having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

The cell reaction for a sodium borohydride reformer fuel cell is as follows:

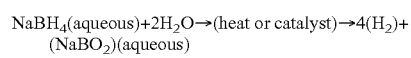

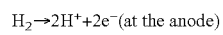

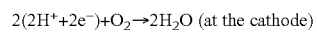

Suitable catalysts include platinum and ruthenium, among other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. Sodium borohydride fuel cell is discussed in United States published patent application no. 2003/0082427, which is incorporated herein by reference.

One of the most important features for fuel cell application is fuel storage. The fuel supply should also be easily inserted into the fuel cell or the electronic device that the fuel cell powers. Additionally, the fuel supply should also be easily replaceable or refillable.

SUMMARY OF THE INVENTION

Hence, the present invention is directed to a fuel supply adapted for use with any fuel cell.

The present invention is also directed to a fuel supply adapted for use with a direct methanol fuel cell.

The present invention is also directed to a fuel supply adapted for use with a reformer fuel cell.

An embodiment of the present invention is directed to a fuel supply comprising an outer casing encasing a fuel compartment containing the fuel, a reactant compartment and a reaction chamber. The fuel is transported from the fuel compartment to the reaction chamber and reacts to form reactants comprising hydrogen gas and liquid reactant. The reactants are then transported to the reactant compartment, where the liquid reactant remains in the reactant compartment and the hydrogen gas passes from the reactant compartment to the fuel cell. The reactant compartment has a gas permeable, liquid impermeable membrane that allows hydrogen gas to pass through.

The fuel supply also has a valve that selectively allows hydrogen gas to pass through to the fuel cell. The fuel supply may also have a pump to transport fuel from the fuel compartment to the reaction chamber. The walls of the fuel compartment and the reactant compartment can be integrally formed and separated by a movable wall that forms a seal with the walls. Each of these compartments may have a liner to contain the fuel or the reactants.

In another embodiment, the liquid reactant is transported to the reactant compartment while the hydrogen gas reactant is transported to the fuel cell.

Another embodiment is directed to a fuel supply comprising an outer casing and at least two inner liners. An absorbent material is positioned between the inner liners, and one of the liners contains fuel and is in fluid communication with a valve connecting this liner to a fuel cell. The other liner may contain byproducts produced by the fuel cell. Preferably, at least one potential energy storage element acts on the liner containing fuel.

Another embodiment is directed to a fuel supply comprising a flexible outer casing and a flexible inner liner containing fuel. The fuel supply is sized and dimensioned to be received in a compartment in an electronic device, and the inner liner is in fluid communication with a valve connecting said liner to a fuel cell inside the electronic device.

Another embodiment is directed to a fuel supply adapted for insertion into an electronic device. The fuel supply comprises a rotatable guide arm mounted on the fuel supply. The guide arm is moved from an original position to an inserting position before the fuel supply is inserted into the electronic device. Preferably, the guide arm is spring-loaded. In the inserting position, the guide arm is aligned with a corresponding channel on the electronic device. The guide arm can be mounted co-axially with or spaced apart from a control valve connecting the fuel supply to a fuel cell in the electronic device. After the fuel supply is inserted, the guide arm returns to the original position to retain the fuel supply inside the electronic device.

Another embodiment is directed to a fuel supply comprising an outer casing, at least one inner liner and a potential energy storage element, wherein the liner contains fuel and is in fluid communication with a valve connecting the liner to a fuel cell. The outer casing comprises internal ribs to guide the movement of the liner and the potential energy storage element when fuel is transported into or out of the liner.

Another embodiment is directed to a fuel supply comprising an outer casing, at least one inner liner and a potential energy storage foam, wherein the liner contains fuel and is in fluid communication with a valve connecting the liner to a fuel cell. The foam may comprise multiple zones of different porosity. Preferably, the zone of highest porosity is spaced farthest from the liner. The foam may also have vent holes to evaporate liquid absorbed in the foam.

The present invention is also directed to methods for forming fuel supplies. One method comprises the steps of (i) providing an upper layer, (ii) forming at least one blister on the upper layer, (iii) laminating a backing layer to the upper layer and forming at least one blister fuel reservoir between the upper and backing layers; and (iv) attaching a valve to the at least one blister fuel reservoir. This method may further comprise the steps of (v) scoring perforating lines around said at least one blister fuel reservoir, and (vi) forming guide tabs from the backing and upper layers, among other steps.

Another method comprises the steps of (i) providing a plurality of materials suitable for use as the fuel supply, (ii) co-extruding a seamless tube from the multiple materials, (iii) attaching at least one end cap having a predetermined shape to the seamless tube to form the fuel supply, and (iv) attaching a valve to the fuel supply.

Another method comprises the steps of (i) providing an inner liner adapted to contain fuel, (ii) attaching a valve to the inner liner, (iii) providing an outer casing comprising two portions, (iv) attaching one portion of the outer casing to a neck portion of the inner liner proximate to the valve, and (v) attaching the other portion of the outer casing to the neck portion of the inner liner, and attaching the two portions of the outer casing to each other.

BRIEF DESCRIPTION OF THE DRAWINGS

In the accompanying drawings, which form a part of the specification and are to be read in conjunction therewith and in which like reference numerals are used to indicate like parts in the various views:

FIG. 3 is an exploded view of another pressurized fuel cartridge in accordance with another embodiment of the present invention in an open position, and FIG. 3A is a cross-sectional view of a valve connectable to a liner in the cartridge of FIG. 3;

DETAILED DESCRIPTION OF THE PREFERRED EMBODIMENTS

Figure 1:
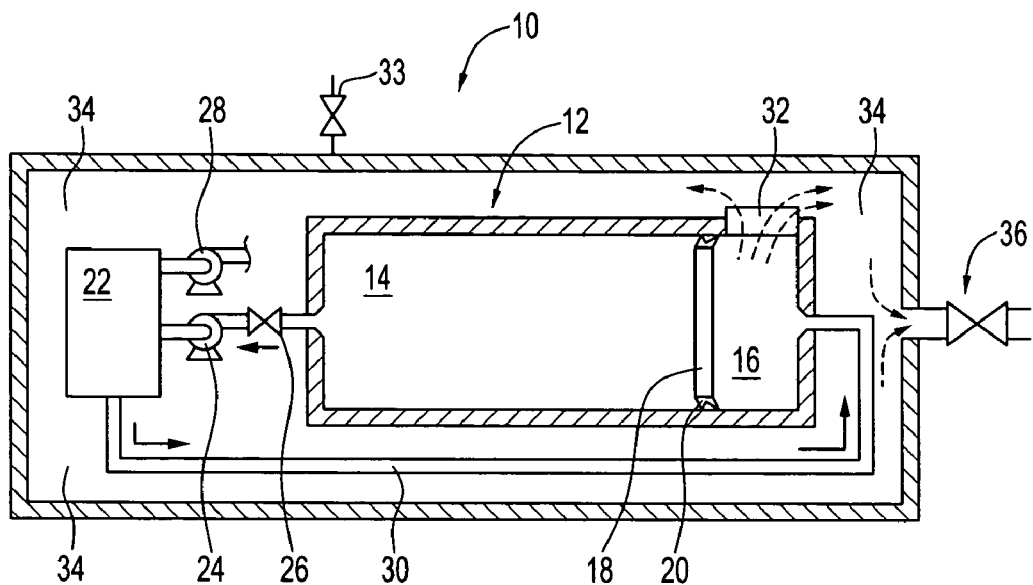
FIG. 1 is a cross-sectional view of a pressurized fuel cartridge in accordance with an embodiment of the present invention.

As illustrated in the accompanying drawings and discussed in detail below, the present invention is directed to a fuel supply, which stores fuel cell fuels such as methanol and water, methanol/water mixture, methanol/water mixtures of varying concentrations or pure methanol. Methanol is usable in many types of fuel cells, e.g., DMFC, enzyme fuel cell, reformat fuel cell, among others. The fuel supply may contain other types of fuel cell fuels, such as ethanol or alcohols, chemicals that can be reformatted into hydrogen, or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid borne zinc particles immersed in a KOH electrolytic reaction solution, and the anodes within the cell cavities are particulate anodes formed of the zinc particles. KOH electrolytic solution is disclosed in United States published patent application no. 2003/0077493, entitled "Method of Using Fuel Cell System Configured to Provide Power to One or More Loads," published on Apr. 24, 2003, which is incorporated herein by reference in its entirety. Fuels also include a mixture of methanol, hydrogen peroxide and sulfuric acid, which flows past a catalyst formed on silicon chips to create a fuel cell reaction. Fuels also include aqueous sodium borohydride ($NaBH_4$) and water, discussed above. Fuels further include hydrocarbon fuels, which include, but are not limited to, butane, kerosene, alcohol, and natural gas, disclosed in United States published patent application no. 2003/0096150, entitled "Liquid Hereto-Interface Fuel Cell Device," published on May 22, 2003, which is incorporated herein by reference in its entirety. Fuels also include liquid oxidants that react with fuels. The present invention is, therefore, not limited to any type of fuels, electrolytic solutions, oxidant solutions or liquids contained in the supply. The term "fuel" as used herein includes all fuels that can be reacted in fuel cells or in the fuel supply, and includes, but is not limited to, all of the above suitable fuels, electrolytic solutions, oxidant solutions, liquids, and/or chemicals and mixtures thereof.

As used herein, the term "fuel supply" includes, but is not limited to, disposable cartridges, refillable/reusable cartridges, cartridges that reside inside the electronic device, cartridges that are outside of the electronic device, fuel tanks, fuel refilling tanks, other containers that store fuel and the tubings connected to the fuel tanks, containers, the fuel cell or the electronic device that the fuel cell powers. While a cartridge is described below in conjunction with the exemplary embodiments of the present invention, it is noted that these embodiments are also applicable to other fuel supplies and the present invention is not limited to any particular type of fuel supplies.

FIG. 1 illustrates cartridge 10 for storing a hydrogen reformat fuel, i.e., any fuel that reacts with other materials or reacts in the presence of a catalyst to produce hydrogen. Hydrogen is then transported to a fuel cell, e.g., a PEM, to be converted into electricity and byproducts. A particular reformat fuel, sodium borohydride, is used herein to describe this aspect of the present invention. It is, however, understood that any fuel that can be reformed to produce hydrogen is usable with this cartridge and is therefore within the scope of this invention.

Cartridge 10 contains chamber 12, which is divided into fuel compartment 14 and reactant compartment 16. The compartments are separated by movable wall 18, which has wiper 20. Wiper 20 or an elastomeric o-ring forms a seal with the inside surface of chamber 12, so that fuel compartment 14 is not in fluid communication with compartment 16. A movable membrane, an extensible membrane or the like can replace movable wall 18, so long as the volume of reactant compartment 16 increases while the volume of fuel compartment 14 decreases. Alternatively, the seal formed by wiper 20 or the o-ring can be omitted if fuel compartment 14 and reactant compartment 16 contain inner liners to store fuel and reactant, separately. Such liners are fully disclosed in commonly owned, co-pending patent application Ser. No. 10/629,004, entitled "Fuel Cartridge with Flexible Liner," filed on Jul. 29, 2003. The disclosure of this application is incorporated herein by reference in its entirety.

Fuel is stored in compartment 14 and when needed is transported to reaction chamber 22 to react in the presence of a catalyst or to be heated. Suitable catalysts include platinum or ruthenium or other metals. Fuel can be transported by pump 24, even when compartment 14 is pressurized, because a pump can regulate when the flow of fuel should start or stop by turning on or off and the pump can meter or control the rate of flow. Alternatively, the fuel can be transported through a wicking or capillary medium. Transportation of fuel cell fuels by wicking or capillary action is fully disclosed in co-pending patent application Ser. No. 10/356,793, entitled "Fuel Cartridge for Fuel Cells," filed on Jan. 31, 2003. This application is incorporated herein by reference in its entirety. An optional check valve 26, i.e., one-direction flow valve, can be positioned between reaction chamber 22 and fuel compartment 14. A suitable fuel stored in compartment 14 is a mixture of sodium borohydride and water. Alternatively, compartment 14 stores aqueous sodium borohydride and a separate compartment (not shown) stores water, and water is pumped to reaction chamber 22 by second pump 28. Reactant hydrogen gas ($H_2$) and aqueous sodium borate ($NaBO_2$) are produced by the reaction in reaction chamber 22. Advantageously, hydrogen fuel is obtained from both sodium borohydride and water thereby increasing the efficiency of the hydrogen output. The reactants are then transported in channel 30 to reactant compartment 16 of chamber 12.

Reactant compartment 16 has membrane 32, which allows hydrogen gas to pass through to internal spacing 34 inside cartridge 10. Consequently, aqueous sodium borate is retained inside reactant compartment 16. As shown by the dash lines, hydrogen gas can be selectively transported out of cartridge 10 through control valve 36 to the fuel cell to produce electricity. Control valve 36 is fully disclosed in commonly owned, co-pending patent application Ser. No. 10/629,006, entitled "Fuel Cartridge with Connecting Valve," filed on Jul. 29, 2003. The disclosure of this application is hereby incorporated by reference in its entirety. Membrane 32 is selected so that a certain pressure differential across the membrane is necessary for hydrogen gas to migrate across the membrane. Due to the presence of hydrogen gas the pressure in reactant compartment 16 is higher than the pressure in fuel compartment 14 and movable wall 18 is pushed by this differential pressure to force fuel out of fuel compartment 14 to reaction chamber 22. To ensure that pressure inside reactant compartment 16 remains higher than fuel compartment 14, a poppet valve as described in the '004 application can be used in conjunction with membrane 32. Alternatively, in place of a poppet valve, a porous member, such as a filler, a foam or the like, can be used. Such porous member requires a pressure drop across it for hydrogen to move from reactant compartment 16 to internal spacing 34 and valve 36.

In accordance with one aspect of the invention, fuel is transported from fuel compartment 14 to reaction chamber 22 by capillary or wicking material instead of by pump 24. In this embodiment, when hydrogen fuel is no longer needed, valve 36 is shut off. Hydrogen in internal spacing 34 stops flowing out and this creates a back pressure. This back pressure stops the flow into reactant chamber 16, which also stops the flow in the circuit. This stops the reaction and fuel production. When fuel is needed again, valve 36 is opened and pressurized hydrogen gas flows out of the cartridge, and this drops the pressure in internal spacing 34, which allows hydrogen gas to flow from reactant chamber 16 to internal spacing 34. This flow again pulls fuel from fuel compartment 14 to reaction chamber 22 to re-start the reaction. Pump 24 can still be used to meter the flow of fuel from compartment 14 by knowing the flow rate(s) through the pump and the time that the pump is on. Cartridge 10 may also have relief valve 33, such as a poppet valve, which is configured to open when the pressure in internal spacing reaches a predetermined level.

Membrane 32 is a gas permeable, liquid impermeable membrane. Such membranes can be made from polytetrafluoroethylene (PTFE), nylon, polyamides, polyvinylidene, polypropylene, polyethylene or other polymeric membrane. A commercially available hydrophobic PTFE microporous membrane can be obtained from W. L Gore Associates, Inc. or Milspore Inc., among others. Goretex® is a suitable membrane. Goretex® is a microporous membrane containing pores that are too small for liquid to pass through, but are large enough to let gas through.

Figure 2:
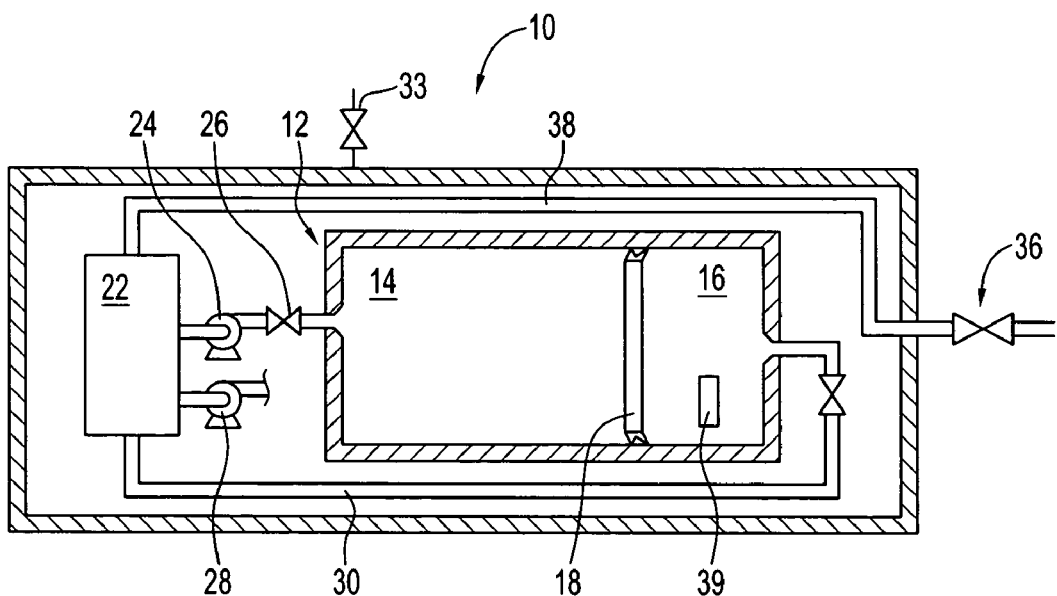
FIG. 2 is a cross-sectional view of another pressurized fuel cartridge in accordance with another embodiment of the present invention.

FIG. 2 shows another embodiment suitable for any liquid fuel that can be reformed to produce hydrogen gas, such as sodium borohydride. Cartridge 10 also has chamber 12, which is divided into fuel compartment 14 and reactant compartment 16. The compartments are separated by movable wall 18. Fuel is transported to reaction chamber 22. In this embodiment, reactant sodium borate ($NaBO_2$) is transported back to reactant compartment 16 through channel 30, but reactant hydrogen gas is transported through channel 38 to valve 36 to be further transported to the fuel cell. Reactant compartment 16 may contain additional reactant 39 or a catalyst, which reacts with sodium borate or with residual or unreacted sodium borohydride to produce a gas that pressurizes reactant chamber 16 to push movable wall 18 to push fuel out of fuel compartment 14. Preferably, channel 30 and reactant compartment 16 are separated by a check valve to prevent the pressuring gas from flowing out of reactant compartment 16. In this embodiment, pump 24 may also be used as a metering device or a measuring device or be replaced by a valve. Reactant 40 can be a metal or any other material that reacts with sodium borate, or reactant 40 can be the catalysts used in chamber 22 to react with the residual sodium borohydride. When fuel is no longer required, valve 36 is shut off, and back pressure is built within channel 38 to stop the flow of fuel over the catalyst in chamber 22 and the reaction stops. When fuel is again required, valve 36 is opened to draw down the pressure in channel to again initiate flow. Alternatively, the flow of fuel can be turned on and off by pump 24 or by a metering device.

Another embodiment of a pressurized cartridge is shown in FIG. 3. Cartridge 40 may contain any type of fuel cell fuels, as discussed above. However, in this embodiment the fuel reforming process, if any, occurs outside of the cartridge. Cartridge 40 comprises housing top 42 and housing body 44. Body 44 is configured and dimensioned to receive fuel liner 46. Fuel liners are fully disclosed in commonly owned, co-pending patent application '004, discussed above. Liner 46 is connected to shut-off valve 36. Valve 36 can be used to fill liner 46 with fuel, and it can also be used to selectively transport fuel from the liner to the fuel cell. In one aspect, valve 36 is mounted on upstanding endwall 50 of body 44. Endwall 50 defines slot 48, which is adapted to receive valve 38. As shown in FIG. 3A, valve 36 comprises two external flanges 51 that straddle endwall 50 to secure valve 36 in place. Preferably, the outer flange is flushed with the outer surface of endwall 50, as shown. Slot 48 can be sealed with a plug, an o-ring or a gasket inserted into slot 48 or with a seal that is a part of the valve. The plug, o-ring or gasket can be made from elastomeric or rubber material, filler materials, among other suitable sealing materials.

Figure 4A:
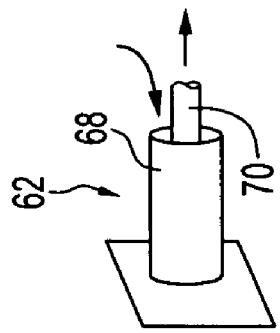
FIGS. 4A and 4B are perspective views of other valves connectable to the liner of FIG. 3.
Figure 4B:
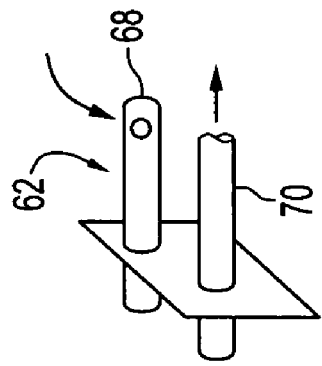
Figure 4:
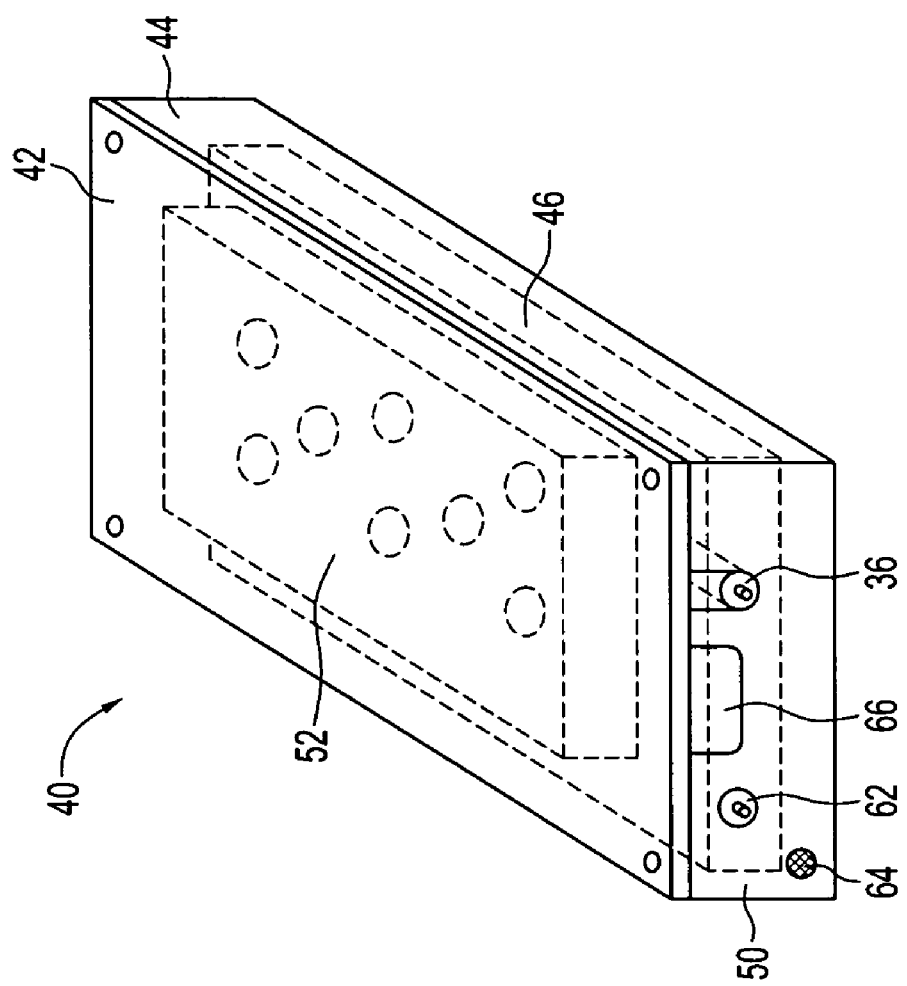
FIG. 4 is a perspective view of the cartridge of FIG. 3 in a closed position.

Top 42 has compressible foam 52 affixed to its inside surface. Foam 52 may have varying porosity throughout its thickness, and may have a single layer or a plurality of layers. Foam 52 can be positioned adjacent to liner 46 before liner 46 is filled, when top 42 is attached to body 44, as shown in FIG. 4, by means of pins 54 and guide holes 56. Top 42 can be attached to body 44 by any means known in the art, such as adhesive bonding, ultrasonic bonding, welding, radio frequency bonding, hot adhesive sealing, or the like. Endwall 50 and the other sidewalls are similarly attached to each other and to bottom 58. Alternatively, endwall 50 and other sidewalls are integrally formed to bottom 58, by compression molding or injection molding. Endwall 50 and the other sidewalls preferably have a plurality of guides 60 to guide the compression and expansion of foam 52 and liner 46.

Endwall 50 may also have venting valve 62 and/or gas permeable, liquid impermeable membrane 64 to allow air to vent when cartridge 40 is filled, or gas byproduct produced by the fuel cell reaction to vent during use. Venting valve 62 is further discussed below, and membrane 64 can be made from the same material as membrane 32, discussed above. Body 44 can also have ridges 61 formed adjacent to liner 46, so that ridges 61 form flow channels in liner 46.

As illustrated in FIG. 4, after top 42 is assembled on body 44, foam 52 should be flushed with empty liner 46 and bottom 58. As fuel is pumped into the cartridge through control or shut-off valve 36, liner 46 expands and compresses foam 52. As foam 52 is compressed, it stores spring potential energy to pressurize liner 46 and assists in the transport of fuel to the fuel cell during use. Also, as foam 52 expands, it creates a partial vacuum inside the cartridge to aid the return of the fuel. Alternatively, liner 46 is filled before it is inserted into body 44. As top 42 is attached to body 44, foam 52 is compressed to store spring potential energy therein.

Also, as fuel is pumped into the cartridge, air trapped in the cartridge is vented through membrane 64. Alternatively, air may be vented through vent valve 62. In one embodiment, valve 62 comprises channels 68 and 70, as shown FIGS. 4A and 4B. Channel 68 allows air and other gases to vent, while channel 70 allows liquid and gas byproducts produced by the fuel cell to be transported to the cartridge. As shown in FIGS. 4A and 4B, channels 68 and 70 are co-axial to each other, i.e., they can be positioned side-by-side to each other or one can be positioned inside the other. Other suitable vents are described in commonly owned, co-pending application '004, which has been incorporated by reference above.

Figure 4C:
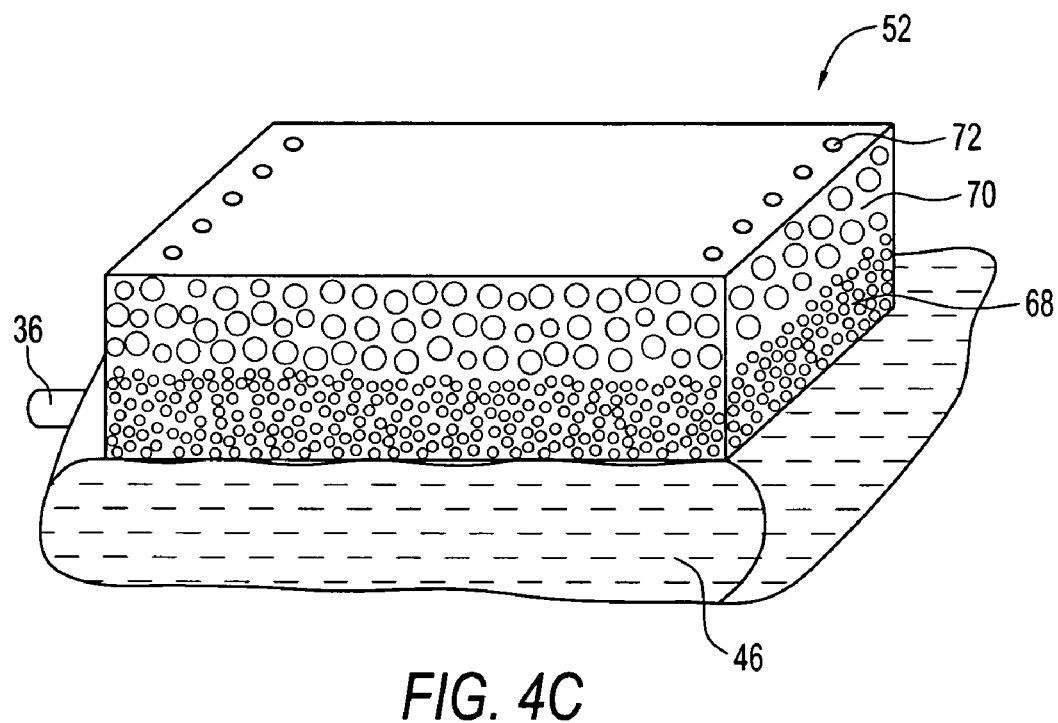
FIG. 4C is a perspective view of the fuel liner and a foam spring with multiple zones.
Figure 6:
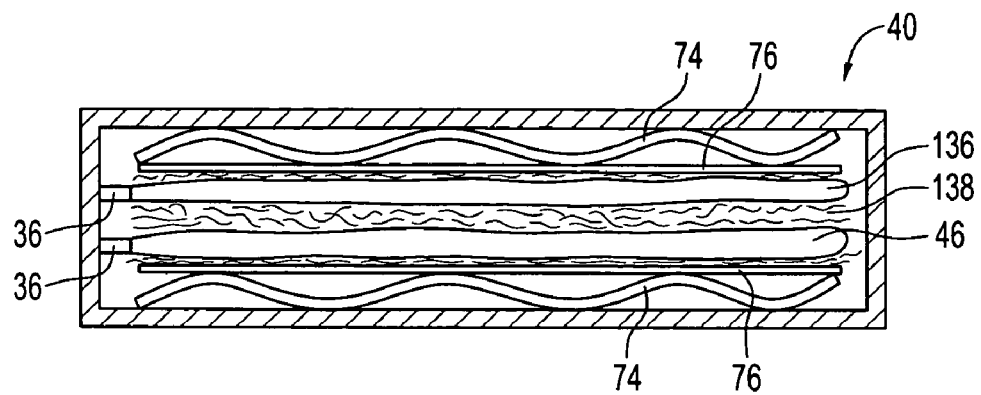
FIG. 6 is a cross-sectional view of another embodiment of the fuel cartridge in accordance with the present invention.

As illustrated in FIG. 4C, foam 52 may have varying porosity throughout its thickness. Preferably, the portion of foam 52 proximate to liner 46 has lower porosity or smaller cells and is more capable of holding the liquid byproduct produced by the fuel cell, e.g., water from a direct methanol fuel cell. The top portion of foam 52 away from liner 46 preferably has higher porosity or larger cells to facilitate evaporation. In one embodiment, foam 52 has at least two zones. Lower zone 68 has lower porosity and upper zone 70 has higher porosity. This porosity distribution helps aerate the water byproduct and assists in the evaporation of water. Foam 52 may also have a plurality of vent holes 72 for evaporating liquids. Alternatively, foam 52 can be sealed with a liquid impermeable, gas permeable membrane similar to membrane 32. Furthermore, foam 52 may swell when liquid byproduct is absorbed and the swelling adds to the pressure applied to liner 46. Also, as illustrated in FIG. 6, foam 52 can be replaced by wave or leaf spring 74 and biased plate 76.

Figure 4D:
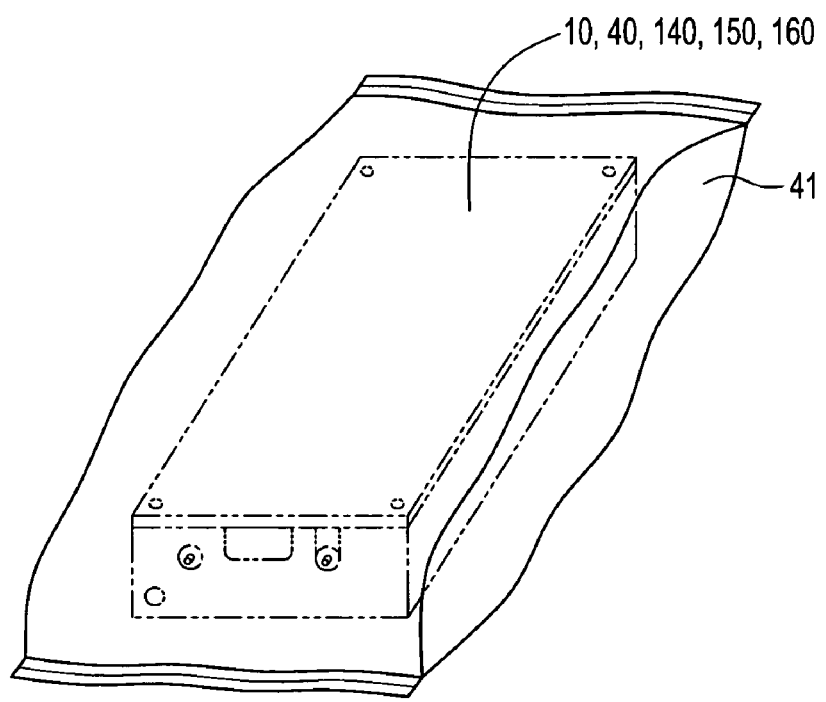
FIG. 4D is a perspective view of the fuel cartridge inside a protective bag.

Cartridge 40 can be stored and sealed in protective bag 41 to extend its shelf life, as shown in FIG. 4D. Bag 41 can be made from aluminum foil or other materials similar to those used in food storage, or those used to wrap printer toners and cartridges. Bag 41 can also be shrink wrapped to cartridge 40. Bag 41 is suitable for use with any fuel cell cartridges, including but not limited to the cartridges described herein. Bag 41 can have single layer or multiple layers.

Figure 5:
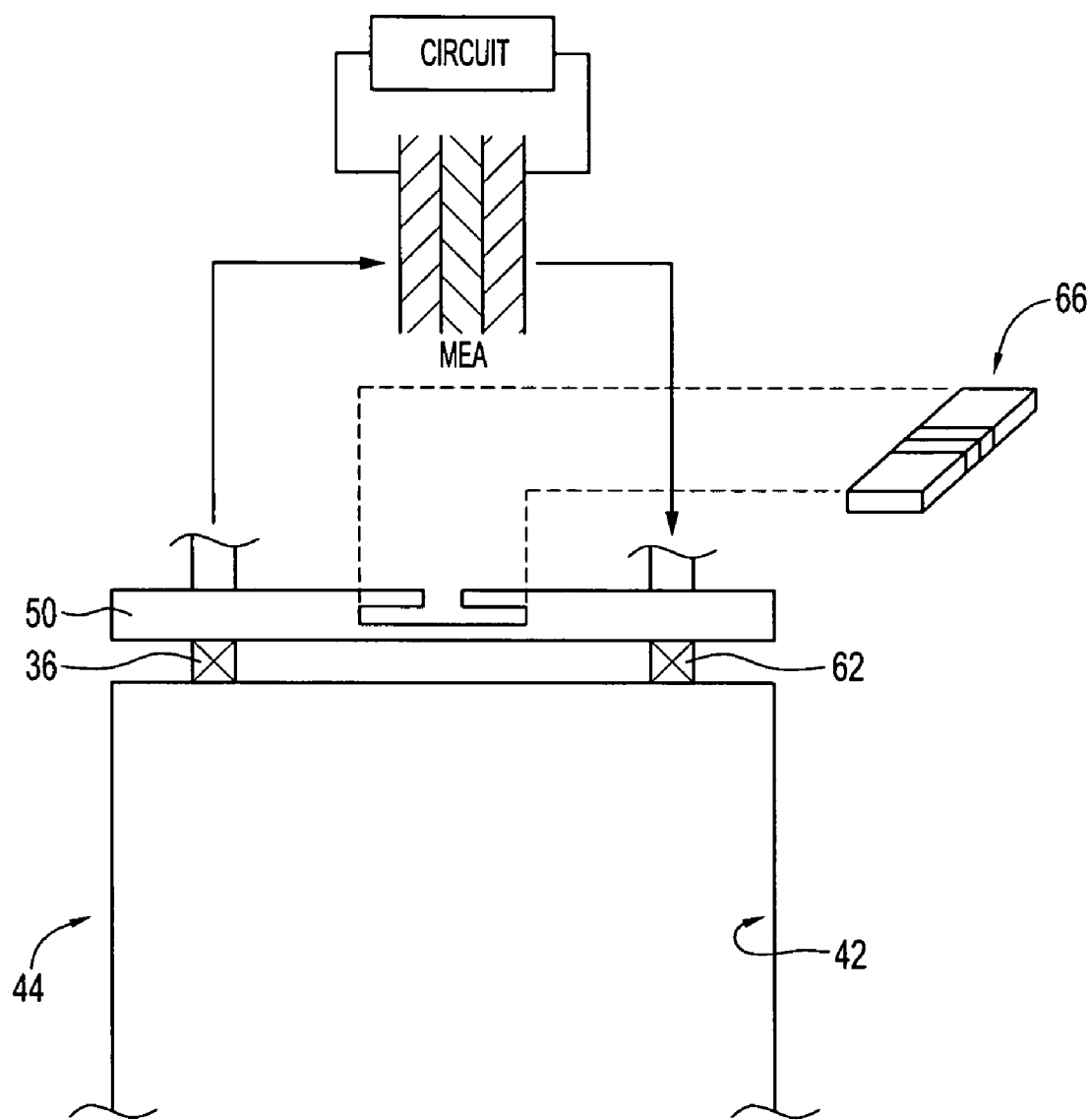
FIG. 5 is a schematic representation of another fuel cartridge in accordance with the present invention.

In accordance with another aspect of the present invention, cartridge 40 can be oriented and configured so that endwall 50 of cartridge 40 forms the top of the cartridge while top 42 forms a part of body 44, as shown in FIG. 5. Shut-off valve 36 and vent valve 62 are both attached to endwall 50 before cartridge 40 is assembled. Endwall 50 may also have identification member 66 disposed thereon to indicate relevant information concerning the cartridge, such as manufacturer, type of fuel, compatible fuel cells, etc.

In accordance with another aspect of the present invention, cartridge 40 may have two or more liners. As shown in FIG. 6, cartridge 40 comprises liner 46 and liner 136. Liner 46 may contain fuel as discussed above. Liner 136 may contain liquid byproducts or a second fuel or electrolyte solution. The two liners are positioned between two compressive elements, wave springs 74 and plates 76, as shown. Compressive foams, as discussed above, can be used instead of the wave springs. Absorbent or retaining material 138 can be disposed between the two liners and/or between the compressive elements to absorb or retain any liquid that may be present.

Figure 7:
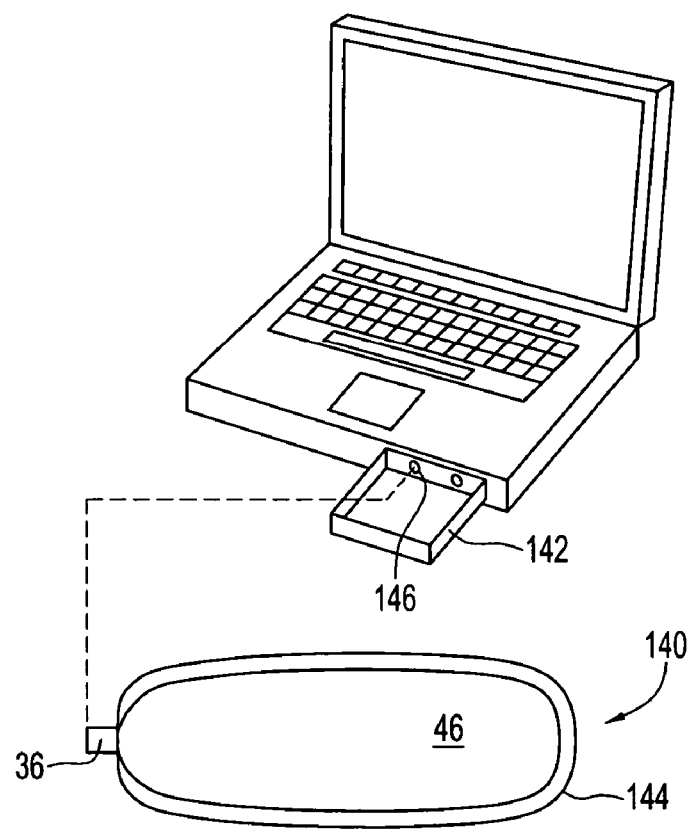
FIG. 7 is an exploded perspective view of an electronic device with another fuel cartridge in accordance with the present invention.

In accordance with another aspect of the present invention, cartridge 140 is adapted to fit directly into chamber 142 of the electronic device. Such chamber can be similarly dimensioned as a DVD or CD-drive on a laptop computer, as shown in FIG. 7. Cartridge 140 preferably has flexible inner liner 46 containing fuel and outer liner 144 surrounding inner liner 46. Outer liner 144 can also be flexible and is made from a durable material, such as aluminum foil or a multi-layer composite sheet to protect the inner liner. Such foils and composite sheets are also known as tetrapack, and have been used in individual juice packages and to cover inkjet and laserjet printer cartridges. Cartridge 140 is advantageously flexible, bendable and conformable to the chamber that holds it. When outer liner 144 is flexible and durable, inner liner 46 can be omitted. Additionally, the volume between the two liners can be filled with absorbent or retaining material 138, shown in FIG. 6. A third liner (not shown) made from an absorbent or retaining material can be inserted between liner 46 and 144.

Control valve 36 connects cartridge 140 to the electronic device by mating with corresponding valve component 146 in the electronic device. Fuel then can be pumped to a fuel cell inside the electronic device. Alternatively, chamber 142 may have a spring or a spring-biased moving wall (not shown) that pushes cartridge 140 once the cartridge is inserted into the device. Additionally, outer liner 144 can be made from a substantially rigid material and cartridge 140 is sized and dimensioned to be inserted into chamber 142.

Figure 8A:
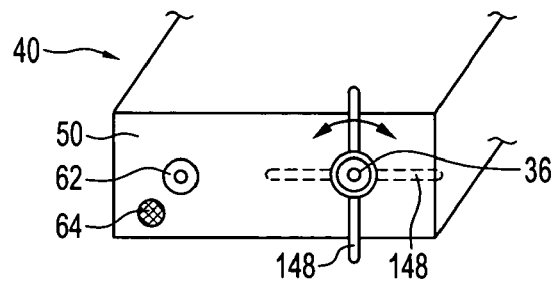
FIGS. 8A-8D are partial front perspective views of the cartridge of FIGS. 3 and 4 showing a guide arm mechanism.

In accordance with another aspect of the invention, cartridge 40 further has at least one movable guide arm 148 that normally in an original position extends beyond the height or width of endwall 50, as shown by the solid line in FIG. 8A. This extension prevents cartridge 40 from being incorrectly inserted into the electronic device. Movable guide arm 148 is preferably spring-loaded so that it is normally biased into the original position shown by the solid line in FIG. 8A. To insert the cartridge properly, a user rotates guide arm 148 either clockwise or counter-clockwise to a predetermined insertion/removal position, as shown by the broken line in FIG. 8B, to remove this extension. After the cartridge is fully and properly inserted, the spring-loaded guide arm 148 returns to its original position to prevent the cartridge from being improperly removed from the electronic device. In this configuration, guide arm 148 is mounted around valve 36. To remove the cartridge, the electronic device rotates the guide arm back to the insertion/removal position and ejects the cartridge.

Figure 8B:
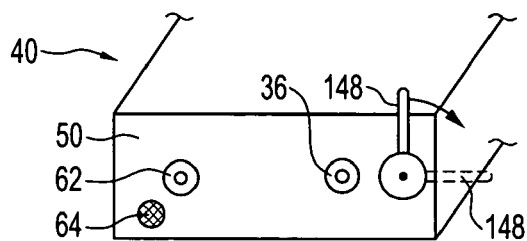

In FIG. 8B, guide arm 148, which may be spring-loaded, is independently mounted on endwall 50 and spaced apart from valve 36. In its original position, guide arm 148 extends above the height of endwall 50, as shown by the solid line, and cannot be inserted. To insert the cartridge, a user rotates it clockwise as shown and aligns guide arm 148 in a predetermined insertion/removal position, such as horizontal and shown by the broken line in FIG. 8B. In this position, guide arm 148 lines up with a channel (not shown) on the electronic device and the cartridge can be properly inserted. After insertion, guide arm 148 returns to its original position and locks the cartridge in place. To remove the cartridge, the electronic device rotates the guide arm back to the insertion/removal position and ejects the cartridge.

Figure 8C:
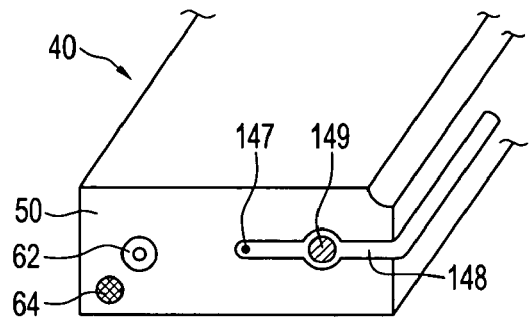
Figure 8D:
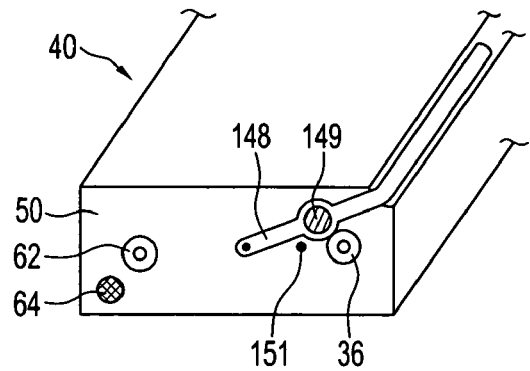

Another embodiment of guide arm 148 is shown in FIGS. 8C and 8D. Guide arm 148 is rotatable around pivot 147, which is located between valve 62 and valve 36. Guide arm 148 further comprises a cover 149, which can be a fuel impermeable membrane. As shown in FIG. 8C, cover 149 seals valve 36, before cartridge 40 is used for the first time. Cover 149 can be sealed to valve 36 with sealing o-ring elastomers or with adhesive. In the original position shown in FIG. 8C, guide arm 148 extends beyond endwall 50 and prevents cartridge 40 from being incorrectly inserted into the electronic device. To insert the cartridge correctly, a user rotates guide arm 148 in the counter-clockwise direction to the insertion/removal position shown in FIG. 8D. In this position, spring arm 148 does not extend beyond endwall 50 and valve 36 is exposed. Cartridge 40 can be inserted into the electronic device and valve 36 can be mated to its corresponding valve in the electronic device to transport fuel from cartridge 40 to the fuel cell that powers the electronic device.

Optional detent 151 can be provided to keep guide arm 148 in the insertion/removal position shown in FIG. 8D. Detent 151 can be spring-loaded, so that it is compressed below guide arm 148 when guide arm 148 is in the original position shown in FIG. 8C and extends outward when guide arm 148 is in the position shown in FIG. 8D. Additionally, guide arm 148 may extend rearward toward the back of the cartridge so that a user can move the guide arm to and from the inserting position from the side or the back of the cartridge. Guide arms 148 can have many configurations and shapes, including but not limited to those illustrated herein.

In addition to being rotatable, as described above, movable guide arm 148 can be slidable relative to end wall 50. Guide arm 148 can also be fixed to end wall 50, but is bendable. The bendable guide arm can be flexible, so that it can return to the original position after being moved to the insertion/removal position. Other configurations of movable guide arm 148 are also possible and are within the scope of the present invention.

Figure 9A:
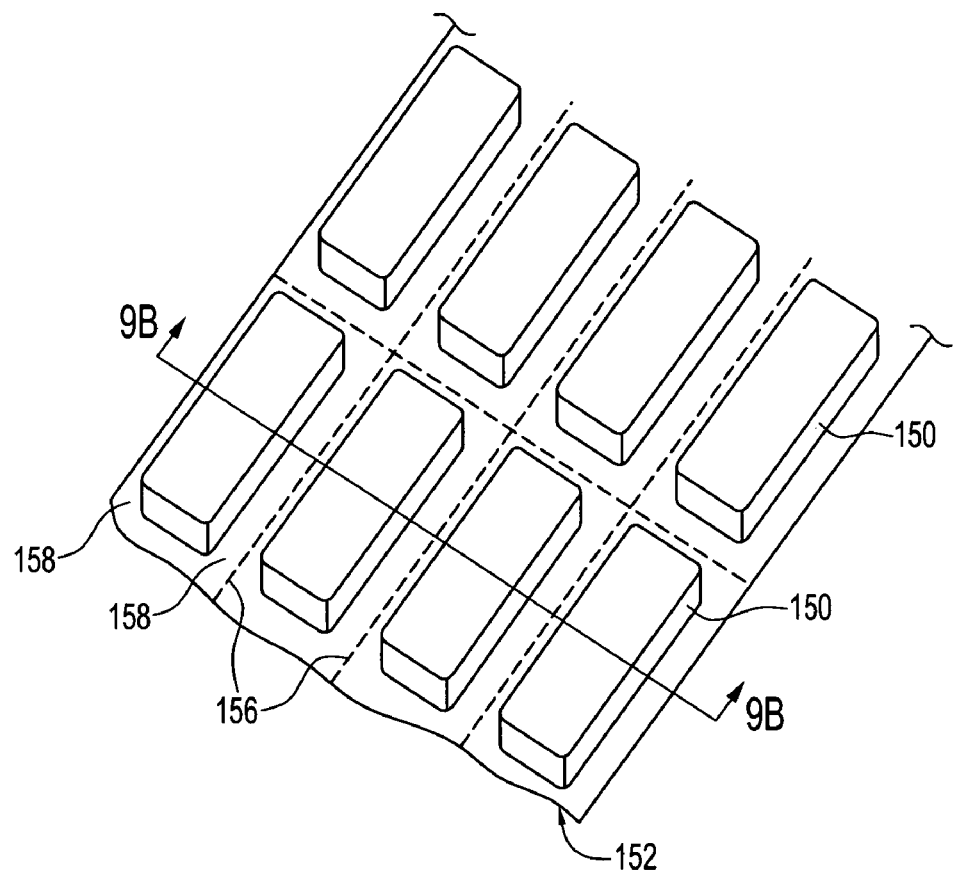
FIG. 9A is a perspective view of thermoformed fuel supplies in accordance with the present invention.
Figure 9B:
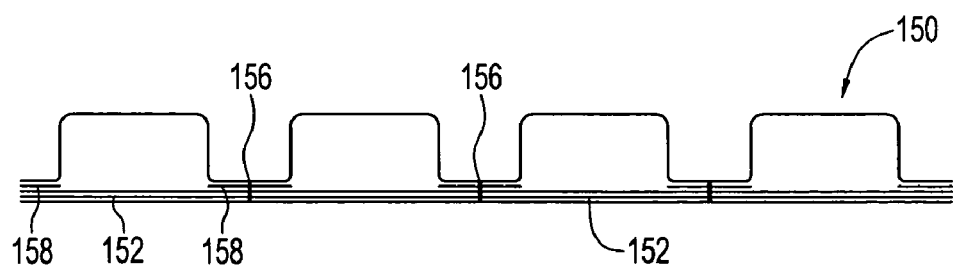
FIG. 9B is a cross-sectional view of the fuel supplies of FIG. 9A along line 9B-9B.

Another aspect of the present invention is shown in FIGS. 9A and 9B. Liners 150 are blister-type fuel supplies formed by a continuous thermoform process. In this process, a top layer is fed between a pair of heated platens. The platens contain protrusions to form the blister on the top layer. The formed top layer is then laminated to backing layer 152. Heated rollers can also be used. The backing can have multiple layers to provide stiffness and structural support to the fuel supplies. Perforation lines 156 are added to the thermoform for ease of separating individual fuel supply 150 from the pack. A control valve 36 is added to each blister 150 and fuel is filled through the control valves. A readily apparent advantage of fuel supply 150 is that it has relatively rigid side tabs 158. These side tabs are sufficiently rigid for use as guide arms for inserting into corresponding guide slots (not shown) on the fuel cell to ensure proper insertion.

Figure 10:
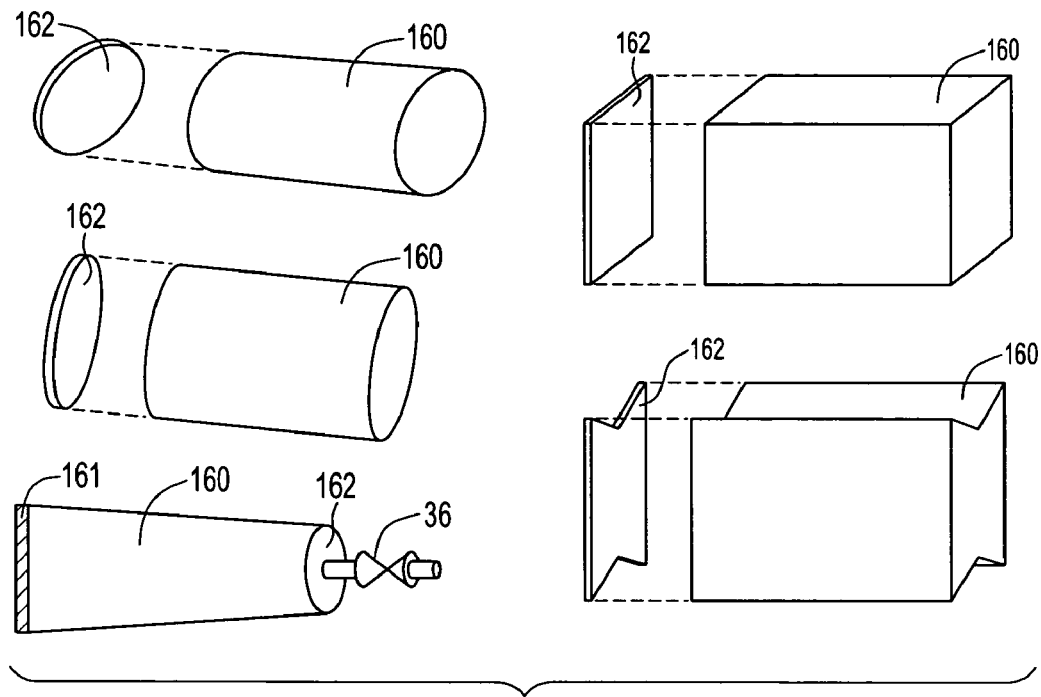
FIG. 10 illustrates exemplary shapes of co-extruded liners in accordance with the present invention.

Another method of making the fuel supplies in accordance with the present invention is to co-extrude a multi-layer film into seamless tube 160 as shown in FIG. 10. The innermost layer is compatible with the fuel cell fuels, i.e., resistance to the fuel, and has low permeability. The middle layer is a barrier to fuel cell fuels or is impermeable. The outermost layer may be another barrier layer and can be resistant to the fuel or chemicals that the liner may be exposed to during its useful life. In one example, innermost layer can be fluorine treated polyethylene (LDPE or HDPE), the middle layer can be nylon or silicane and the outer layer can be an aluminum foil. Each layer is preferably extruded and laminated in the same manufacturing process to ensure high bond integrity.

Extruded tube 160 is flexible and can assume any shape. The final shape of the liner depends in part on the shape of end cap 162 that is attached to tube 160. Tube 160 can also have polygonal shape and can also be pleated, as shown. Tube 160 can be sealed to end caps 162 by heat generated by radio frequency, ultrasonic or other heat sources. Alternatively, tube 160 can be attached at one end to end cap 162 and valve 36, and be sealed to itself at the other end, similar in shape to a toothpaste tube, as shown in FIG. 10. The liner can also be shrink-wrapped in aluminum foil. This prolongs the shelf life of the cartridge, since the innermost layer can withstand the fuel's corrosive effect and the middle and outer layers provide barriers to keep the fuel inside the liner and the outer layer prevents ultraviolet light from degrading the liner. Multi-layer liners are fully disclosed in co-pending patent application '004, discussed above. The disclosure of this application has already been incorporated by reference.

Figure 11:
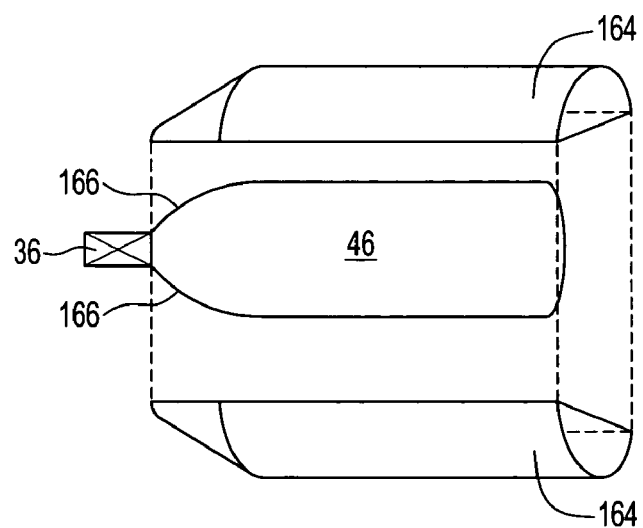
FIG. 11 illustrates an exemplary method of attaching the outer casing to the liner in accordance with the present invention.

In accordance with another aspect of the present invention, the outer casing comprises two halves 164 that are welded by radio frequency, ultrasonic or other heat sources to inner liner 46, as illustrated in FIG. 11. Preferably, inner liner 46 already has control valve 36 attached thereto. Each half 164 is welded to neck region 166 of liner 46, as shown, and welded to each other to form fuel supply in accordance with the present invention.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. A fuel supply containing a fuel for use by a fuel cell comprising:
   a first fuel compartment containing the fuel, a second reactant compartment and a third reaction chamber;
   wherein the fuel is transported by a pump from the first fuel compartment to the third reaction chamber, where the fuel reacts to form reactants comprising hydrogen gas and liquid reactant, and thereafter the hydrogen gas and liquid reactant are transported through a conduit to the second reactant compartment, wherein the pump meters a rate of flow of fuel from the first fuel compartment to the third reaction chamber; and
   wherein the second reactant compartment is at least partially inside a housing member and comprises a gas permeable, liquid impermeable membrane disposed on a wall of the second reactant compartment, and the hydrogen gas passes through the gas permeable, liquid impermeable membrane and out of the second reactant compartment and is contained in an internal spacing located between the second reactant compartment and the housing member and then to the fuel cell and the liquid reactant remains in the second reactant compartment.

2. The fuel supply of claim 1, wherein the fuel supply further comprises a valve and the valve selectively allows hydrogen gas to pass through to the fuel cell.

3. The fuel supply of claim 1 further comprising an outer casing, wherein the outer casing is substantially impermeable to hydrogen gas.

4. The fuel supply of claim 3, wherein hydrogen gas is stored within the outer casing.

5. The fuel supply of claim 1, wherein the walls of the first fuel compartment and the second reactant compartment are integrally formed.

6. The fuel supply of claim 5, wherein the first fuel compartment and the second reactant compartment are separated by a movable wall.

7. The fuel supply of claim 6, wherein the movable wall forms a seal with the walls of the second reactant compartment and first fuel compartment.

8. The fuel supply of claim 7, wherein the seal comprises a wiper or an o-ring pressing against the walls of the second reactant compartment and first fuel compartment.

9. The fuel supply of claim 1, wherein the fuel comprises sodium borohydride.

10. The fuel supply of claim 9, wherein the liquid reactant comprises sodium borate.

11. The fuel supply of claim 9, wherein the third reaction chamber comprises platinum or ruthenium.

12. The fuel supply of claim 1, wherein the fuel comprises methanol.

13. The fuel supply of claim 1, wherein the third reaction chamber comprises a catalyst.

14. The fuel supply of claim 1, wherein the first fuel compartment comprises a liner and the fuel is contained in the liner.

15. The fuel supply of claim 1, wherein the second reactant compartment comprises a liner and the liquid reactant and hydrogen gas are contained in the liner.

16. The fuel supply of claim 1, wherein a pressure differential is required for hydrogen gas to pass through the gas permeable, liquid impermeable membrane so that a pressure in the second reactant compartment is higher than a pressure in the first fuel compartment.

17. The fuel supply of claim 1, wherein the second reactant compartment further comprises a poppet valve, a porous member, a fill or a foam which requires a pressure differential for hydrogen gas to pass therethrough to ensure that a pressure in the second reactant compartment is higher than a pressure in the first fuel compartment.

18. The fuel supply of claim 1 further comprising a one-way valve is disposed between the third reaction chamber and the first fuel compartment.

19. The fuel supply of claim 1 further comprising a channel comprises a wicking material to transport fuel from the first fuel compartment to the third reaction chamber.

20. The fuel supply of claim 1, wherein the first fuel compartment and the second reactant compartment are housed in an outer casing.

21. The fuel supply of claim 20, wherein the third reaction chamber is housed in the outer casing.

22. A fuel supply containing a fuel for use by a fuel cell comprising:
   a first fuel compartment containing the fuel, a second reactant compartment and a third reaction chamber;
   wherein the fuel is transported from the first fuel compartment to the third reaction chamber, where the fuel reacts to form hydrogen gas and liquid reactant, and thereafter the hydrogen gas and liquid reactant are transported to the second reactant compartment,
   wherein the second reactant compartment is at least partially inside a housing member and comprises a gas permeable, liquid impermeable membrane disposed on a wall of the second reactant compartment and fluidly connecting the second reactant compartment to the housing member, and the hydrogen gas passes through the gas permeable, liquid impermeable membrane and out of the second reactant compartment and is contained in an internal spacing located between the second reactant compartment and the housing member and then to the fuel cell and wherein a pressure differential is required for hydrogen gas to pass through the gas permeable, liquid impermeable membrane so that a pressure in the second reactant compartment is higher than a pressure in the first fuel compartment.

23. The fuel supply of claim 22, wherein the second reactant compartment further comprises a poppet valve, a porous member, a fill or a foam, which requires a pressure differential for hydrogen gas to pass therethrough.

24. The fuel supply of claim 22, wherein the first fuel compartment and the second reactant compartment are housed in an outer casing.

25. The fuel supply of claim 24, wherein the third reaction chamber is housed in the outer casing.

26. The fuel supply of claim 24, wherein the outer casing is substantially impermeable to hydrogen gas.

27. The fuel supply of claim 26, wherein hydrogen gas is stored within the outer casing.

28. The fuel supply of claim 22, wherein as a volume of the first fuel compartment decreases, a volume of the second reactant compartment increases.

29. The fuel supply of claim 22 further comprising a one-way valve is disposed between the third reaction chamber and the first fuel compartment.

30. The fuel supply of claim 22 further comprising a pump to transport fuel from the first fuel compartment to the third reaction chamber.

31. The fuel supply of claim 22, wherein the first fuel compartment is connected to the third reaction chamber by a channel and the channel comprises a wicking material to transport fuel from the first fuel compartment to the third reaction chamber.

32. A fuel supply containing a fuel for use by a fuel cell comprising:
 a first fuel compartment containing the fuel, a second reactant compartment and a third reaction chamber, wherein the second reactant compartment is at least partially inside a housing member and;
 wherein the fuel is transported from the first fuel compartment to the third reaction chamber, where the fuel reacts to form hydrogen gas and liquid reactant, and thereafter the hydrogen gas and liquid reactant are transported to the second reactant compartment,
 wherein the hydrogen gas passes out of the second reactant compartment and is contained in an internal spacing located between the second reactant compartment and the housing member and then to the fuel cell and wherein the second reactant compartment comprises a poppet valve, a porous member, a fill or a foam fluidly connecting the second reactant compartment to the housing member, which requires a pressure differential for hydrogen gas to pass therethrough to ensure a pressure in the second reactant compartment is higher than a pressure in the first fuel compartment.

33. The fuel supply of claim 32, wherein the second reactant compartment comprises a gas permeable, liquid impermeable membrane, and the hydrogen gas passes through the gas permeable, liquid impermeable membrane to the fuel cell.

34. The fuel supply of claim 32, wherein the first fuel compartment and the second reactant compartment are housed in an outer casing.

35. The fuel supply of claim 34, wherein the third reaction chamber is housed in the outer casing.

36. The fuel supply of claim 32, wherein as a volume of the first fuel compartment decreases, a volume of the second reactant compartment increases.

37. The fuel supply of claim 32 further comprising a one-way valve is disposed between the third reaction chamber and the first fuel compartment.

38. The fuel supply of claim 32 further comprising a pump to transport fuel from the first fuel compartment to the third reaction chamber.

39. The fuel supply of claim 32, wherein the first fuel compartment is connected to the third reaction chamber by a channel and the channel comprises a wicking material to transport fuel from the first fuel compartment to the third reaction chamber.

40. A fuel supply containing a fuel for use by a fuel cell comprising:
 a first fuel compartment containing the fuel, a second reactant compartment and a third reaction chamber, wherein the second reactant compartment is at least partially inside a housing member;
 wherein the fuel is transported through a channel from the first fuel compartment to the third reaction chamber, where the fuel reacts to form hydrogen gas and liquid reactant, and thereafter the hydrogen gas and liquid reactant are transported to the second reactant compartment, wherein said channel comprises a wicking material,
 wherein the hydrogen gas passes out of the second reactant compartment and is contained in an internal spacing located between the second reactant compartment and the housing member and then to the fuel cell through a shut-off valve, wherein when the shut-off valve is closed the back pressure stops the flow of fuel into the third reaction chamber to stop the reaction of fuel.

41. The fuel supply of claim 40, wherein the second reactant compartment comprises a gas permeable, liquid impermeable membrane, and the hydrogen gas passes through the gas permeable, liquid impermeable membrane to the fuel cell.

42. The fuel supply of claim 41, wherein a pressure differential is required for the hydrogen gas to pass through the gas permeable, liquid impermeable membrane.

43. The fuel supply of claim 40, wherein the second reactant compartment further comprises a poppet valve, a porous member, a fill or a foam, which requires a pressure differential for hydrogen gas to pass therethrough to ensure a pressure in the second reactant compartment is higher than a pressure in the first fuel compartment.

44. The fuel supply of claim 40, wherein the first fuel compartment and the second reactant compartment are housed in an outer casing.

45. The fuel supply of claim 44, wherein the third reaction chamber is housed in the outer casing.

46. The fuel supply of claim 40, wherein as a volume of the first fuel compartment decreases, a volume of the second reactant compartment increases.

47. The fuel supply of claim 40 further comprising a one-way valve is disposed between the third reaction chamber and the first fuel compartment.

48. The fuel supply of claim 40 further comprising a pump to transport fuel from the first fuel compartment to the third reaction chamber.

49. A fuel supply containing a fuel for use by a fuel cell comprising:
 a first fuel compartment containing the fuel, a second reactant compartment and a third reaction chamber, wherein the second reactant compartment is at least partially inside a housing member;

wherein the fuel is transported from the first fuel compartment to the third reaction chamber, where the fuel reacts to form hydrogen gas and liquid reactant, and thereafter the hydrogen gas and liquid reactant are transported to the second reactant compartment and wherein the hydrogen gas passes out of the second reactant compartment and is contained in an internal spacing located between the second reactant compartment and the housing member and then to the fuel cell, and wherein a single valve is positioned between the first fuel compartment and the third reaction chamber and wherein the valve is one-directional from the first fuel compartment to the third reaction chamber.

50. The fuel supply of claim 49, wherein the fuel is transported by a pump.

51. The fuel supply of claim 49, wherein the second reactant compartment comprises a gas permeable, liquid impermeable membrane.

52. The fuel supply of claim 49, wherein the second reactant compartment further comprises a poppet valve, a porous member, a fill or a foam, which requires a pressure differential for hydrogen gas to pass therethrough to ensure a pressure in the second reactant compartment is higher than a pressure in the first fuel compartment.

* * * * *